US012663674B2

(12) United States Patent
Kim et al.

(10) Patent No.: US 12,663,674 B2
(45) Date of Patent: Jun. 23, 2026

(54) BACKLIGHT UNIT AND DISPLAY DEVICE

(71) Applicant: LG ELECTRONICS INC., Seoul (KR)

(72) Inventors: Seho Kim, Seoul (KR); Kilhoon Lee, Seoul (KR); Yongil Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 24 days.

(21) Appl. No.: 18/729,037

(22) PCT Filed: May 11, 2022

(86) PCT No.: PCT/KR2022/006710
§ 371 (c)(1),
(2) Date: Feb. 3, 2025

(87) PCT Pub. No.: WO2023/219182
PCT Pub. Date: Nov. 16, 2023

(65) Prior Publication Data
US 2025/0180949 A1     Jun. 5, 2025

(51) Int. Cl.
G02F 1/13357 (2006.01)

(52) U.S. Cl.
CPC .. G02F 1/133608 (2013.01); G02F 1/133603 (2013.01); G02F 1/133605 (2013.01); G02F 1/133606 (2013.01)

(58) Field of Classification Search
CPC ......... G02F 1/133608; G02F 1/133603; G02F 1/133605; G02F 1/133606;
(Continued)

(56) References Cited

U.S. PATENT DOCUMENTS

| | | | | | |
|---|---|---|---|---|---|
| RE46,609 | E | * | 11/2017 | Kawase | ............ G02F 1/133605 |
| 2007/0279338 | A1 | * | 12/2007 | Varrin | ...................... G09F 9/33 |
| | | | | | 345/82 |

(Continued)

FOREIGN PATENT DOCUMENTS

| | | | |
|---|---|---|---|
| CN | 202452301 U | * | 9/2012 |
| CN | 202902181 | | 4/2013 |

(Continued)

OTHER PUBLICATIONS

Korean Intellectual Property Office Application No. 10-2024-7019717, Office Action dated Aug. 28, 2025, 6 pages.

(Continued)

*Primary Examiner* — Erin Kryukova
(74) *Attorney, Agent, or Firm* — LEE, HONG, DEGERMAN, KANG & WAIMEY

(57)                    ABSTRACT

A backlight unit comprises: a backlight substrate including a first substrate which extends in a first direction and a plurality of second substrates which extend from the first substrate in a second direction perpendicular to the first direction and are spaced apart from each other in the first direction; a plurality of light-emitting elements arranged at the front surface of each of the second substrates to be spaced apart from each other in the second direction; and a reinforcement substrate intersecting the plurality of second substrates and extending in the first direction. The backlight unit can not only reduce unit production cost but can also ensure rigidity.

19 Claims, 11 Drawing Sheets

(58) Field of Classification Search
CPC .......... G02F 1/133314; G02F 2202/28; H05K
1/142; F21Y 2105/10; F21V 19/003;
F21V 19/0035; F21V 23/005; F21V
15/01; F21V 19/005; F21V 19/0055
See application file for complete search history.

(56) References Cited

U.S. PATENT DOCUMENTS

| | | | | |
|---|---|---|---|---|
| 2014/0204309 | A1* | 7/2014 | Sakurai | G02F 1/133603 349/61 |
| 2015/0029710 | A1* | 1/2015 | Kim | F21K 9/20 362/249.02 |
| 2015/0198293 | A1* | 7/2015 | Lankhorst | H05K 3/0097 362/249.02 |
| 2016/0357055 | A1* | 12/2016 | Yeo | G02F 1/133608 |
| 2016/0363816 | A1 | 12/2016 | Song et al. | |
| 2017/0051904 | A1* | 2/2017 | Tsai | G02F 1/133608 |
| 2019/0129230 | A1* | 5/2019 | Isono | G02F 1/133608 |

FOREIGN PATENT DOCUMENTS

| | | | | |
|---|---|---|---|---|
| CN | 217443694 | U | * | 9/2022 |
| JP | 2010-278071 | | | 12/2010 |
| KR | 10-2008-0046335 | | | 5/2008 |
| KR | 10-2010-0080024 | | | 7/2010 |
| KR | 10-2013-0073816 | | | 7/2013 |
| KR | 10-1308752 | | | 9/2013 |
| KR | 10-2016-0099774 | | | 8/2016 |
| KR | 10-1650920 | | | 8/2016 |
| WO | WO-2010146933 | A1 | * | 12/2010 ....... G02F 1/133608 |

OTHER PUBLICATIONS

European Patent Office Application Serial No. 22941769.6, Search Report dated Feb. 19, 2025, 8 pages.
PCT International Application No. PCT/KR2022/006710, International Search Report dated Feb. 8, 2023, 11 pages.

* cited by examiner (a)

(b)

(a)                                    (b)

20

21    22    23  26

(a)

220a                                              220b (b)

226

(a)

(b)

(c)

(d)

(a)

(b)

( a )

( b )

( a )

( b )

BACKLIGHT UNIT AND DISPLAY DEVICE

CROSS-REFERENCE TO RELATED APPLICATION(S)

This application is the National Stage filing under 35 U.S.C. 371 of International Application No. PCT/KR2022/006710, filed on May 11, 2022, the contents of which is hereby incorporated by reference herein in its entirety.

TECHNICAL FIELD

The present disclosure relates to a backlight unit capable of reducing production costs while securing rigidity, and a display including the same.

BACKGROUND ART

With the increasing development of information society, the demand for display devices is also increasing in various forms. In response to this trend, various display devices, for example, Liquid Crystal Display (LCD), Field Emission Display (FED), Plasma Display Panel (PDP), an electroluminescent device, etc. have recently been developed.

A liquid crystal panel of the LCD may include a liquid crystal layer, may further include a thin film transistor (TFT) substrate and a color filter substrate that are arranged to face each other on the basis of the liquid crystal panel interposed therebetween, and may display an image using light provided from a backlight unit.

As an example of an electroluminescent device, active-matrix-type organic light emitting display (OLED) devices are commercially available on the market and widely used throughout the world. Since the OLED device is a self-emitting device, the OLED device has no backlight and is advantageous in terms of a response speed and a viewing angle as compared to the LCD, so that the OLED devices are attracting attention as next-generation displays.

Recently, self-emissive materials, such as an Organic Light-Emitting Diode (OLED), that do not use a backlight installed at a rear surface of a display enable implementation of a curved display panel.

In order to reduce production costs of the display and at the same time reduce a total weight of the display, research has been actively conducted to implement an improved display with a minimum number of available members while omitting unnecessary members from the display.

DISCLOSURE

Technical Problem

An object of the present disclosure is to provide a backlight unit capable of reducing production costs and securing rigidity, and a display including the same.

Technical Solutions

In accordance with an aspect of the present disclosure, a backlight unit may include: a backlight substrate configured to include a first substrate extending in a first direction and a plurality of second substrates extending from the first substrate in a second direction perpendicular to the first direction while being spaced apart from each other in the first direction; a plurality of light emitting diodes (LEDs) arranged on a front surface of the second substrate to be spaced apart from each other in the second direction; and a reinforcement substrate configured to cross the plurality of second substrates and extending in the first direction.

The backlight unit may further include: a first guide hole formed in the first substrate and a second guide hole formed in the reinforcement substrate, wherein the first guide hole and the second guide hole are formed at the same position in the first direction.

The backlight unit may further include: a first screw hole formed in the first substrate and a second screw hole formed in the reinforcement substrate, wherein the first screw hole and the second screw hole are formed at the same position in the first direction.

The backlight unit may further include: a back adhesive tape disposed on a back surface of the backlight substrate and provided with at least one diffuser plate supporter (DPS) hole disposed between the plurality of second substrates, wherein the reinforcement substrate is disposed on a back surface of the back adhesive tape.

The backlight unit may further include: a front adhesive tape located on a front surface of the backlight substrate and provided with a hole formed in a portion corresponding to each light emitting diode (LED); and a reflector coupled to a front surface of the front adhesive tape and provided with an opening formed in a portion corresponding to each light emitting diode (LED), wherein the front adhesive tape and the back adhesive tape are bonded to each other not only on the plurality of second substrates but also between the plurality of second substrates.

The reinforcement substrate may be spaced apart from the first substrate and disposed adjacent to an end of the second substrate.

The reinforcement substrate may have the same length as the first substrate.

A distance between the plurality of second substrates in the first direction is greater than a width of the second substrate in the first direction, wherein each of the second substrates includes a node scheduled to protrude toward both sides of the second substrate in the second direction.

In accordance with another aspect of the present disclosure, a display device may include: a cover bottom; a backlight unit disposed at a front surface of the cover bottom; and a liquid crystal panel disposed at a front surface of the backlight unit. The backlight unit includes: a backlight substrate configured to include a first substrate extending in a first direction and a plurality of second substrates extending from the first substrate in a second direction perpendicular to the first direction while being spaced apart from each other in the first direction; a plurality of light emitting diodes (LEDs) arranged on a front surface of the second substrate to be spaced apart from each other in the second direction; and a reinforcement substrate configured to cross the plurality of second substrates and extending in the first direction.

The display device may further include: a first guide hole formed in the first substrate; a second guide hole formed in the reinforcement substrate; and a plurality of guide protrusions formed on the cover bottom and inserted into the first guide hole or the second guide hole.

The backlight unit may include: a front adhesive tape located on a front surface of the backlight substrate and provided with a hole formed in a portion corresponding to each light emitting diode (LED); a reflector coupled to a front surface of the front adhesive tape and provided with an opening formed in a portion corresponding to each light emitting diode (LED); and a diffuser plate located on a front surface of the reflector.

The display device may further include: a diffuser plate supporter (DPS) configured to support a back surface of the diffuser plate while forming an optical gap between the light emitting element (LED) and the diffuser plate, wherein the diffuser-plate supporter is disposed between the plurality of second substrates.

The diffuser-plate supporter may include: a base coupled to a front surface of the cover bottom; a support portion configured to contact a back surface of the diffuser plate; and an elastic portion disposed between the base and the support portion and configured to maintain the optical gap.

The display device may further include: a back adhesive tape disposed on a back surface of the backlight substrate and provided with a diffuser plate supporter (DPS) hole corresponding to the base of the diffuser-plate supporter.

The reinforcement substrate may be disposed on a back surface of the back adhesive tape.

The front adhesive tape and the back adhesive tape may be bonded to each other between the plurality of second substrates.

The display device may further include: a first screw hole formed in the first substrate and a second screw hole formed in the reinforcement substrate, wherein the first screw hole and the second screw hole are formed at the same position in the first direction.

The cover bottom may have a groove corresponding to the reinforcement substrate so that the groove is formed on a front surface of the cover bottom.

The backlight unit may include an LED driver connected to the first substrate, and the cover bottom may include a printed circuit board (PCB) hole through which the LED driver passes.

A distance between the plurality of second substrates in the first direction is greater than a width of the second substrate in the first direction, wherein each of the second substrates includes a node scheduled to protrude toward both sides of the second substrate in the second direction.

Advantageous Effects

As is apparent from the above description, the backlight unit according to the embodiments of the present disclosure can reduce production costs and at the same time secure rigidity.

In addition, the backlight unit according to the embodiments of the present disclosure can improve the convenience of the fastening assembly process by including guide holes to facilitate coupling to the cover bottom.

Effects obtainable from the present embodiments are not limited by the above mentioned effects, and other unmentioned effects can be clearly understood from the above description by those having ordinary skill in the technical field to which the present disclosure pertains.

BEST MODE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
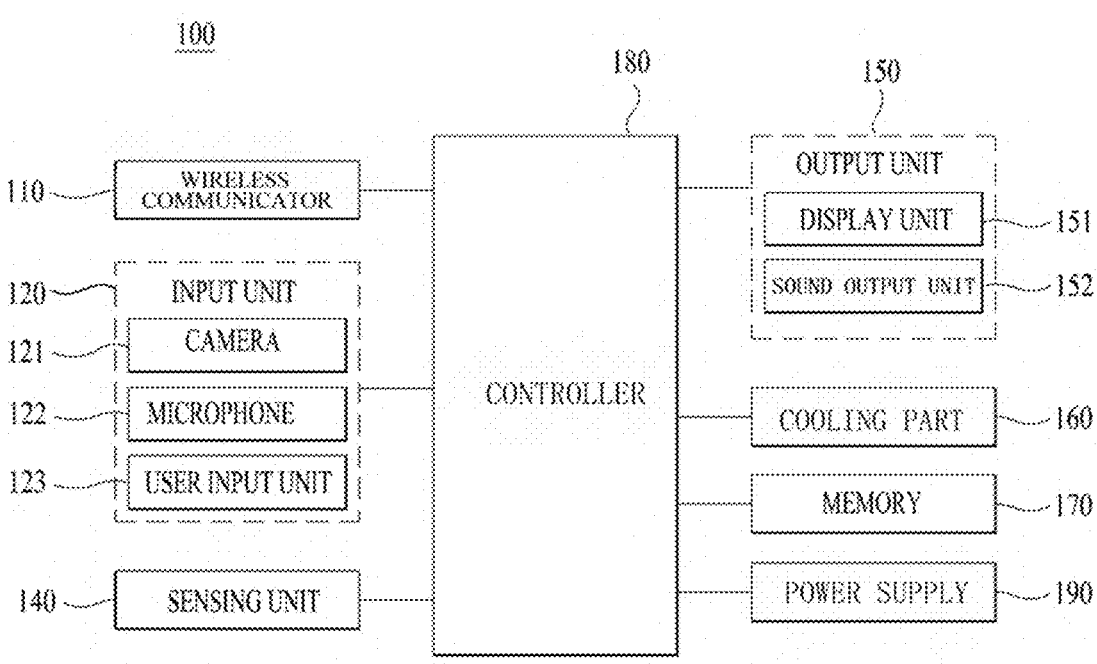
FIG. 1 is a block diagram illustrating components of a display device according to the present disclosure.

FIG. 1 is a block diagram illustrating a display device 100 related to the present disclosure.

The display device 100 may include a wireless communicator 110, an input unit 120, a sensing part 140, an output unit 150, a cooling part 160, a memory 170, a controller 180, and a power supply 190. The components shown in FIG. 1 are not essential to implement the display device 100, and the display device 100 described herein may have more or fewer components than those listed above.

More specifically, the wireless communicator 110 among the components may include one or more modules that enable wireless communication between the display device 100 and a wireless communication system, between the display device 100 and another display device 100, or between the display device 100 and an external server. Additionally, the wireless communicator 110 may include one or more modules that connect the display device 100 to one or more networks.

The wireless communicator 110 may include at least one of a mobile communication module, a wireless internet module, or a short-range communication module.

The input unit 120 may include a camera 121 or image input unit configured to input an image signal, a microphone 122 or audio input unit configured to input an audio signal, and a user input unit 123 (e.g., a touch key, a mechanical key, etc.) configured to input information from a user. Voice data or image data collected by the input unit 120 may be analyzed and processed as control commands from the user.

Recently, as a bezel of the display device 100 decreases in size, the number of display devices 100 each including a minimum number of input units 130 formed in a physical button exposed to the outside is rapidly increasing. Instead, a minimum number of physical buttons may be provided on the back or side surface of the display device 100. The display device may receive user input through the remote controller 200 through a touchpad or a user input interface unit 173 to be described later.

The sensing part 140 may include one or more sensors configured to sense at least one of information in the display device 100, information about the environment surrounding the display device 100, or user information. For example, the sensing part 140 may include at least one of a proximity sensor, an illumination sensor, a touch sensor, an RGB sensor, an infrared (IR) sensor, a finger scan sensor, an ultrasonic sensor, an optical sensor (e.g., the camera 121), a microphone (see 122), a battery gauge, an environmental sensor (e.g., a barometer, a hygrometer, a thermometer, a radiation detection sensor, a heat detection sensor, a gas detection sensor, etc.), a chemical sensor (e.g., an electronic nose, a healthcare sensor, or a biometric sensor, etc.). The display device 100 disclosed herein may utilize pieces of information sensed by at least two of these sensors in combination.

The controller 180 may check a state of the display device 100 based on information collected by the sensing unit 120, may notify the user of a problem, or may control the display device 100 to be kept in the best state.

The output unit 150 is configured to generate outputs related to visual, auditory, or tactile senses, and may include at least one of a display unit 151 and a sound output unit 152. The display unit 151 may be layered or integrally formed with the touch sensor, thereby implementing a touchscreen. Such a touch screen may function as the user input unit 123 to provide an input interface between the display device 100 and a user, and may provide an output interface between the display device 100 and the user.

The display 151 may be implemented as a plasma display panel (PDP), a liquid crystal display (LCD), an organic light emitting diode (OLED), a flexible display, etc. In addition, the display 151 may also be implemented as a three-dimensional (3D) display. The three-dimensional (3D) display 151 may be classified into a glassless-type 3D display and a glasses-type 3D display.

Meanwhile, the display 151 may be constituted by a touchscreen, whereby an input device may also be used in addition to an output device.

Figure 2:
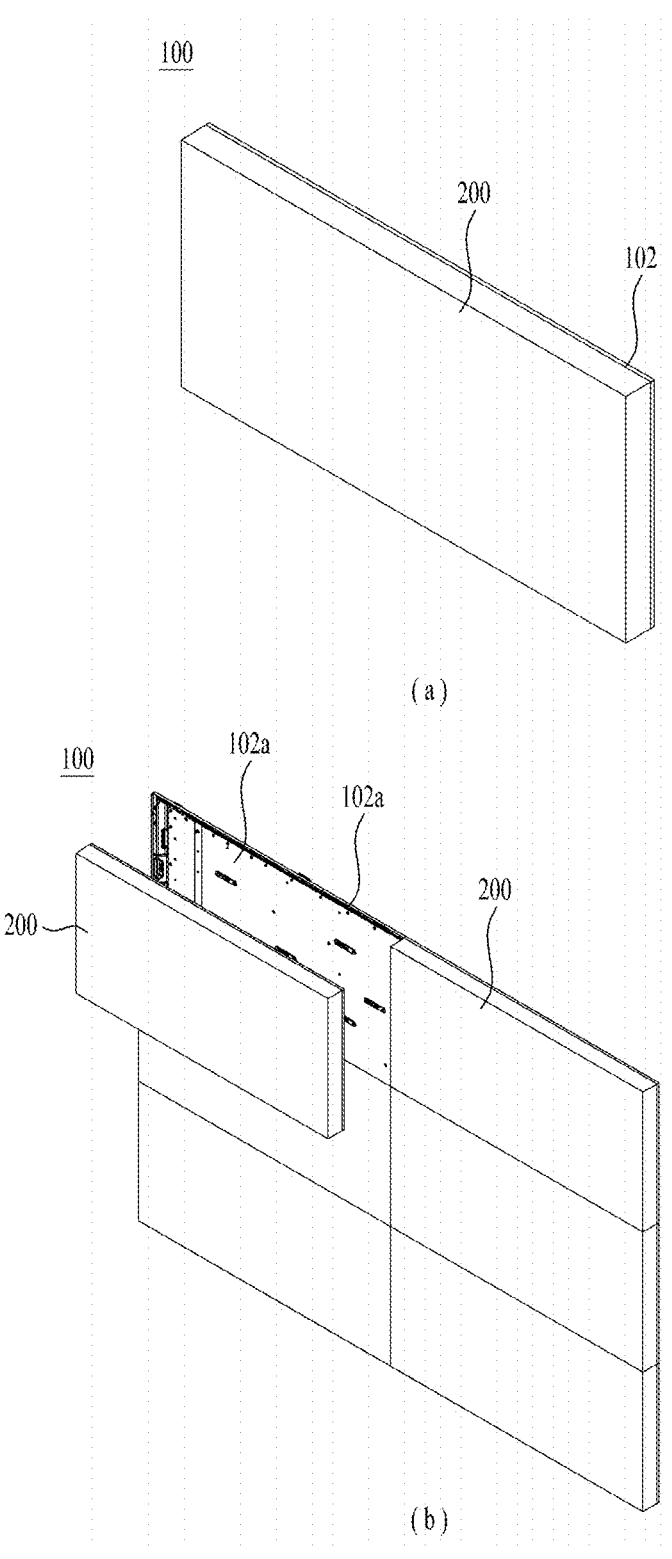
FIG. 2 is a perspective view illustrating an example of the display device according to the present disclosure.

Referring to FIG. 2, the display device 100 according to the present disclosure may implement a large screen display 151 by arranging a plurality of display modules 200 in a grid shape.

The cooling part 160 represents a component that dissipates heat from the display device 100, and may include heat pipes or cooling fins, and a circulating fan configured to enhance air circulation within the display device 100, and a vent hole or the like.

When installed for the purpose of exhibition or advertisement, the display device 100 is operated for a long time and outputs high brightness to be clearly visible from the outside. Therefore, the heat generated by the display 151 and the controller 180 may affect each part of the display device 100, resulting in malfunctions, etc. Therefore, a heat dissipation structure to dissipate the internal heat is very important.

In the display device 100, heat dissipation is implemented in various ways. Depending on how heat transfer is performed during the heat dissipation process, heat dissipation may be divided into air-cooling or water-cooling. In the case of air-cooling, heat dissipation efficiency can be increased by maximizing the surface area using heat fins or the like. In the case of water-cooling, heat dissipation efficiency can be increased by using a structure such as a heat pipe to guide flow and sealing of the heat transfer material.

Any of these cooling methods for heat dissipation may be used alone, or two or more of these methods may be used in combination as needed.

The memory 170 stores data that supports various functions of the display device 100. The memory 170 may store multiple application programs or applications running on the display device 100, data for operation of the display device 100, and instructions. At least some of these applications may be downloaded from an external server through wireless communication. In addition, at least some of these applications may be present on the display device 100 from the time of shipment for basic functions of the display device 100 (e.g., making and receiving calls, receiving messages, and sending messages). The applications may be stored in the memory 170, installed on the display device 100, and driven by the controller 180 to perform an operation (or function) of the display device 100.

In addition to operations related to the applications, the controller 180 generally controls the overall operation of the display device 100. The controller 180 may provide or process appropriate information or functions for the user by processing signals, data, information, etc. that are input or output through the components discussed above, or by driving applications stored in the memory 170.

Further, the controller 180 may control at least some of the components to run the applications stored in the memory 170. Further, the controller 180 may operate at least two of the components included in the display device 100 in combination to drive the applications.

The controller 180 may include at least one processor, and may control the overall operation of the display device 100 using the processor included therein. Here, the processor may be a general processor, such as a central processing unit (CPU). Of course, the processor may be a dedicated device, such as an ASIC, or another hardware-based processor.

An image signal processed by the controller 180 may be input to the display module 151, which may display an image corresponding to the image signal.

In addition, the image signal processed by the controller 180 may be input to an external output device through the external device interface unit 112.

In addition, the controller 180 may control the display device 100 according to a user command input through the user input interface unit or an internal program. Meanwhile, the controller 180 may control the display module 151 to display an image. At this time, the image displayed on the display module 151 may be a still image or video, or may be a 2D image or a 3D image.

Meanwhile, the controller 180 may perform control such that a predetermined 2D object is displayed in an image displayed on the display module 151. For example, the object may be at least one of a connected web screen (newspaper or magazine), an electronic program guide (EPG), various menus, a widget, an icon, a still image, video, and text.

Meanwhile, the controller 180 may modulate and/or demodulate a signal using an amplitude shift keying (ASK) method. Here, the amplitude shift keying (ASK) method may be a method of changing the amplitude of a carrier depending on a data value to modulate a signal or restoring an analog signal to a digital data value depending on the amplitude of a carrier.

For example, the controller 180 may modulate an image signal using the amplitude shift keying (ASK) method, and may transmit the modulated image signal through a wireless communication module.

For example, the controller 180 may demodulate and process an image signal received through the wireless communication module using the amplitude shift keying (ASK) method.

As a result, the display device 100 may easily transmit and receive a signal to and from another image display device disposed adjacent thereto without using a unique identifier, such as a media access control (MAC) address, or a complicated communication protocol, such as TCP/IP.

The power supply 190 may supply power to the components of the display device 100. In particular, the power supply may supply power to the controller 180, which may be implemented in the form of a system on chip (SOC), the display module 150 for image display, and the audio output unit 160 for audio output.

Specifically, the power supply 190 may include an AC/DC converter (not shown) configured to convert AC power into DC power and a DC/DC converter (not shown) configured to convert the level of the DC power.

The power supply 190 serves to distribute power supplied from the outside to the respective components of the display device. The power supply 190 may be directly connected to an external power supply in order to supply AC power, or may include a battery so as to be used by charging.

At least some of the components may operate in cooperation with each other to implement an operation, control, or control method of the display device 100 according to various embodiments described below. In addition, the operation, control, or control method of the display device 100 may be implemented on the display device 100 by driving at least one application program stored in the memory 170.

That is, two or more elements may be integrated into one element, or one element may be divided into two or more elements, as needed. In addition, the function performed by each block is for describing the embodiment of the present disclosure, and the specific operations and components thereof do not limit the scope of rights of the present disclosure.

FIG. 2 is a perspective view illustrating an example of the display device 100 according to the present disclosure.

The display device 100 can implement a display 151 in which images are output to a display module 200 integrally formed as shown in FIG. 2(*a*), and a plurality of display modules 200 may be arranged in a grid shape as shown in FIG. 2(*b*) to form a large screen.

Since each of the display modules 200 uses a thin substrate or a sheet material, the display module 200 may be bent or damaged. The display module 200 may include a cover bottom 102. The cover bottom 102 may support a back surface of the display to form the rear exterior of the display device 100.

Referring to FIG. 2(*a*), the display device 100 using one display module 200 may use the cover bottom 102 corresponding to the size of the display module 200. When using the plurality of display modules 200 as shown in FIG. 2(*b*), the plurality of display modules 200 may be mounted to one cover bottom 102 in a grid shape.

The cover bottom 102 may use metal materials such as iron, aluminum, and magnesium for rigidity and heat generation. In order to effectively dissipate heat generated from the display module 200, a heat dissipation sheet 102*a* may be further provided on the front surface of the cover bottom 102. The heat dissipation sheet 102*a* may contain a material with high thermal conductivity, and may improve the heat dissipation effect by quickly spreading heat in a surface direction while transferring heat to the cover bottom 102.

Figure 3:
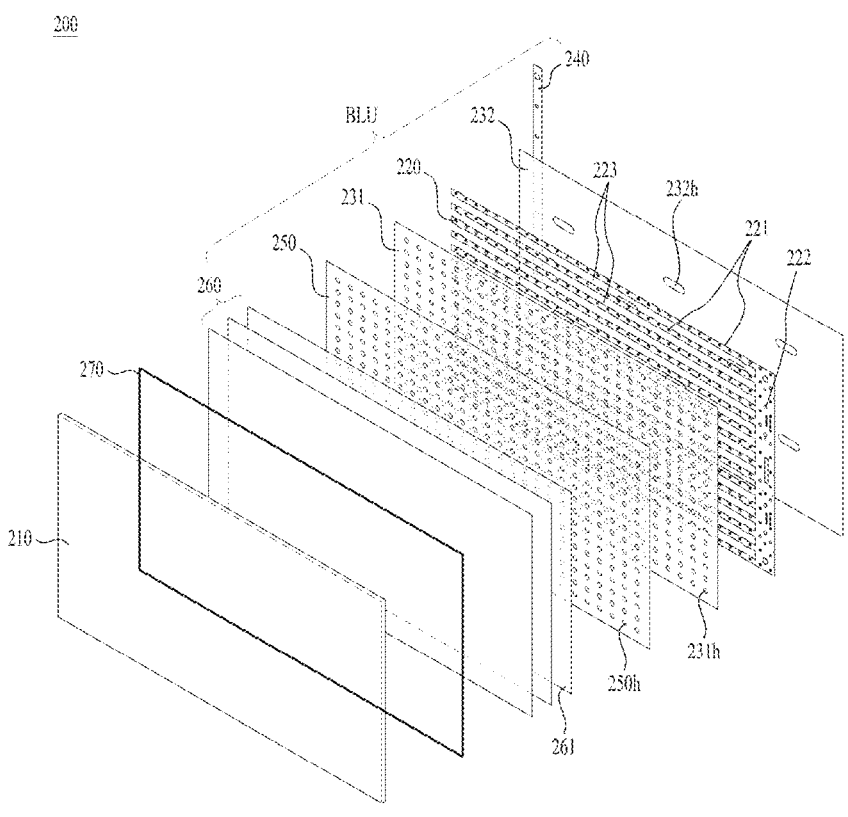
FIG. 3 is an exploded perspective view illustrating the example of the display module according to the present disclosure.

FIG. 3 is an exploded perspective view illustrating the example of the display module 200 according to the present disclosure. The embodiment of FIG. 2(*a*) can be implemented using only the display module 200 shown in FIG. 3, and the embodiment of FIG. 2(*b*) can be implemented using a plurality of display modules 200 shown in FIG. 3.

Referring to FIG. 3, the display module 200 may include a backlight unit (BLU) that provides light and a display panel 210 that outputs image information by adding color to the light supplied from the backlight unit (BLU). The display panel 210 may include a liquid crystal panel that selectively passes light, and a color filter to implement color may be disposed on the liquid crystal panel.

A guide panel 270 may be used to align the positions of the backlight unit (BLU) and the display panel 210. The guide panel 270 may have a frame shape such as a picture frame, and a display panel 210 may be mounted on the front surface of the guide panel 270 and the backlight unit (BLU) may be mounted on the back surface of the guide panel 270.

The backlight unit (BLU) may include a backlight substrate 220 on which light emitting diodes (LEDs) 227 that emit light are mounted, a reflector 250 disposed on the front surface of the backlight substrate 220, and an optical sheet layer 260 including a diffuser plate 261 disposed on the front surface of the reflector 250.

The plurality of light emitting diodes (LEDs) 227 may be arranged in a grid shape on the backlight substrate 220. The backlight substrate 220 may receive power, may apply the power to each LED 227, and may emit light toward the display panel 210 located on the front surface of the backlight substrate 220.

If the light emitted from the LEDs 227 is reflected by the optical sheet layer 260 or the display panel 210 and is not emitted in the front direction, light may be lost. Since luminance of the display device 100 decreases when light is lost, an additional reflector 250 may be further provided so that all of the light emitted by the LEDs 227 can be directed in a forward direction.

The reflector 250 may include a plurality of openings that exposes the LEDs 227 formed on the backlight substrate 220, and the remaining regions other than the openings may have a surface with high reflectivity.

The reflector 250 may be coupled to the front surface of the backlight substrate 220, and may be provided with a front adhesive tape 231 located on the front surface of the backlight substrate 220 to interconnect the backlight substrate 220 and the reflector 250.

The front adhesive tape 231 may include a plurality of openings formed at positions corresponding to the LEDs 227 so that the LEDs 227 are exposed through the openings of the reflector 250.

The front adhesive tape 231 may be located not only on the second substrate 222 of the backlight substrate 220 but also between the plurality of second substrates 222. This is because the front adhesive tape 231 is difficult to process and cumbersome to attach to a target object, so that a separate front adhesive tape 231 fabricated in a form without removing a section between the second substrates 222 can be used.

Since the front surface of the front adhesive tape 231 is coupled to the reflector, fastening force with the reflector 250 can be improved.

Since the front surface of the front adhesive tape 231 is coupled to the radiation plate, the fastening force with the reflection plate 250 may be improved. A diffuser plate 261 is required to convert light from the LEDs 227 that are used as point light sources, into a surface light source. The diffuser plates 261 may diffuse and reflect light to provide uniform brightness to the display panel 210, and may be disposed to be spaced apart from the LEDs 227 in order to sufficiently diffuse light from the diffuser plate 261.

The optical sheet layer 260 including the diffuser plates 261 may be made of a plurality of thin and transparent materials, and the guide panel 270 may guide the optical sheet layer 260, the reflector 250, and the backlight substrate 220 to be aligned at the correct positions.

Figure 4:
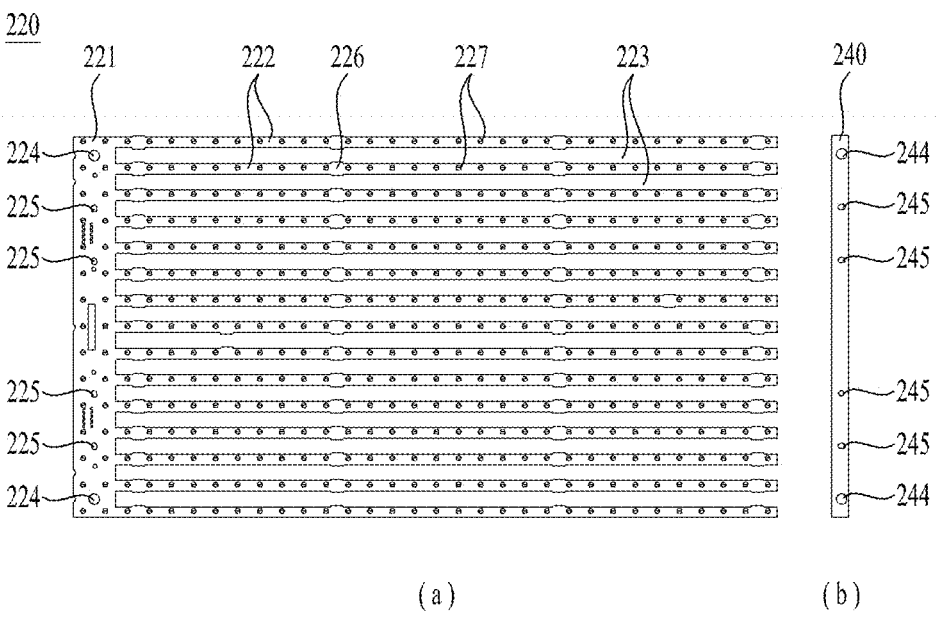
FIG. 4 is a diagram illustrating a backlight substrate and a reinforcement substrate of a display device according to an embodiment of the present disclosure.

FIG. 4 is a diagram illustrating the backlight substrate 220 and the reinforcement substrate 240 of the display device 100 according to an embodiment of the present disclosure. The backlight substrate 220 may not have a rectangular plate shape but may have a fork shape including a plurality of branches as shown in FIG. 4(a).

More specifically, the backlight substrate 220 may include a first substrate 221 extending in a first direction, and a plurality of second substrates 222 extending from the first substrate 221 in a second direction perpendicular to the first direction. The first substrate 221 is located on the left in the drawing, but the left and right directions can be changed. The second substrates 222 may be arranged to be spaced apart in the first direction, and the distance between the second substrates 222 may be equal so that the second substrates 222 may be arranged at equal intervals.

The LEDs 227 are mounted on the second substrate 222, and the first substrate 221 is connected to a plurality of second substrates 222 to supply power to each LED 227. An LED driver that receives signals and power sources by connecting to the controller can be connected to a first substrate 221. The LEDs 227 mounted on the second board 222 may be connected to the LED driver through the first substrate 221.

The first substrate 221 may include a first guide hole 224 inserted into a guide protrusion formed on the cover bottom 102 to align the backlight substrate 220 onto the cover bottom 102.

The backlight substrate 220 may be attached to the cover bottom 102 with a back adhesive tape, but the backlight substrate 220 may be fixed to the cover bottom 102 using screw(s) so as to reinforce the fastening force. Therefore, if necessary, the first screw hole 225 may be formed on the first substrate 221 to fasten the screw.

Since the second substrate 222 has a smaller width than the first substrate 221, it is difficult to form the first guide hole 224 and the first screw hole 225. If the first guide hole 224 and the first screw hole 225 are biased in one direction, it may be difficult to align a portion spaced apart from the first substrate 221 and secure the fastening force.

The conventional backlight substrate 220 is implemented using a square substrate, but the volume and weight thereof are increased. As a result, conventionally, there can be used the backlight substrate 220 in which the substrate is arranged only in an area where the LEDs 227 are located as shown in FIG. 4(a) and the remaining area other than the area may be omitted.

Figure 5:
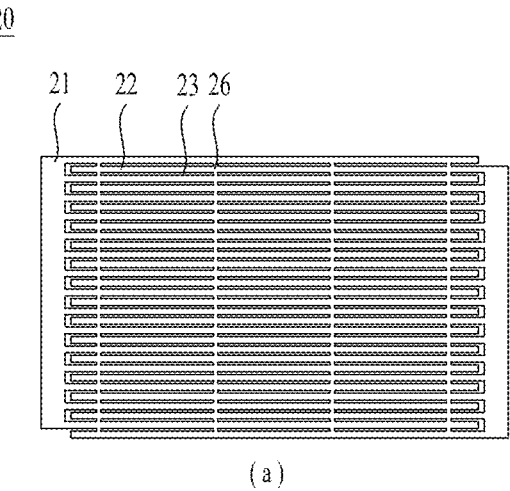
FIG. 5 is a diagram illustrating a method of manufacturing the backlight substrate according to an embodiment of the present disclosure.
Figure 5:
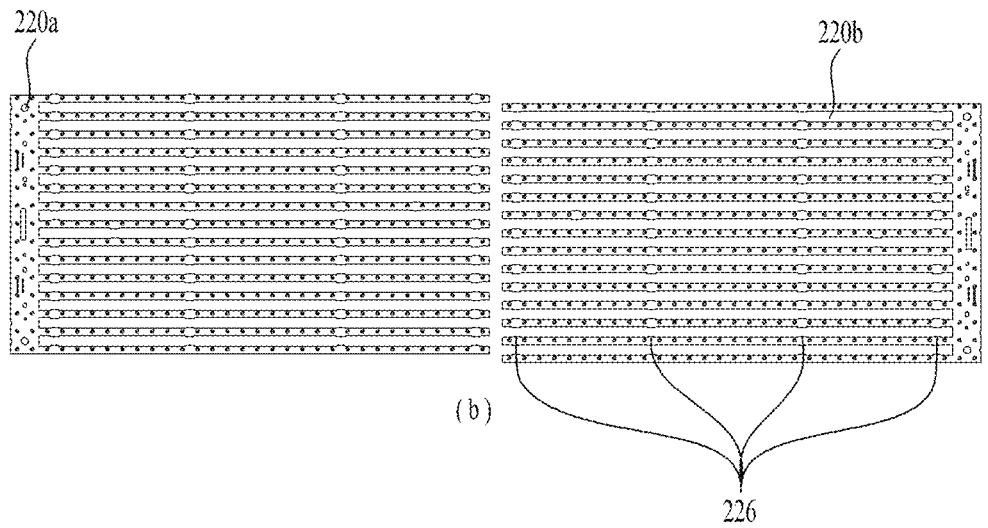

FIG. 5 is a diagram illustrating a method of manufacturing the backlight substrate 220 according to an embodiment of the present disclosure. The substrate can be processed in the form shown in FIG. 5(a). That is, the backlight substrate 220 may include a plurality of slits. If the length of each of the slits is too long, sagging may occur, so that a connector 26 by which the slits are partially connected may be included in the backlight substrate 220.

The ends of the slits may be alternately connected to neighboring slits to form serpentine-shaped slits. After processing the substrate into the form shown in FIG. 5(a), components such as the LEDs, silicon lenses, connector Zener diodes, etc. can be mounted on the substrate using the SMT method.

Afterwards, the connector 26 is severed using a laser processing method to implement a slit extending horizontally. Since the slit is elongated from the end portion in a serpentine shape, two backlight substrates 220 can be isolated from each other as shown in FIG. 5(b).

At this time, the severed connector 26 may protrude in the first direction more than other parts of the second substrate 222, and as shown in FIG. 4(a), nodes 226 may be formed sparsely on the second substrate 222.

Since one substrate is divided into two substrates, a space between the second substrates 222 is the space where the second substrate 222 of the other backlight substrate 220 was located. Accordingly, a first-directional interval between the second substrates 222 may be larger than a first-directional width of the second substrate 222.

The backlight substrate 220 is configured such that, component costs are reduced as the area of the backlight substrate 200 is cut in half and the backlight substrate 220 is open in the front and back directions. Thus, the backlight substrate 220 is advantageous to dissipate heat generated from the light source.

However, the backlight substrate 220 according to the present disclosure has a lower rigidity than the conventional backlight substrate formed in one plate shape, so that the backlight substrate 220 according to the present disclosure is vulnerable to sagging or bending deformation.

In order to improve the rigidity of the fork-shaped backlight substrate 220, a reinforcement substrate 240 as shown in FIG. 4(b) may be further provided. The reinforcement substrate 240 extends in the same direction (i.e., the first direction) as the first substrate 221, and may include a second guide hole 244 and a second screw hole 245.

By using the reinforcement substrate 240, the backlight substrate 220 can be arranged in the second direction at the correct position on the cover bottom 102 through a plurality of guide holes and screw holes in the second direction.

Since the reinforcement board 240 is not a board on which electronic components are mounted, a bar-shaped steel material rather than a printed circuit board (PCB) may be used. However, when using a metal material, distortion may occur during thermal expansion, and thus the same material as the backlight substrate 220 can be used.

Figure 6:
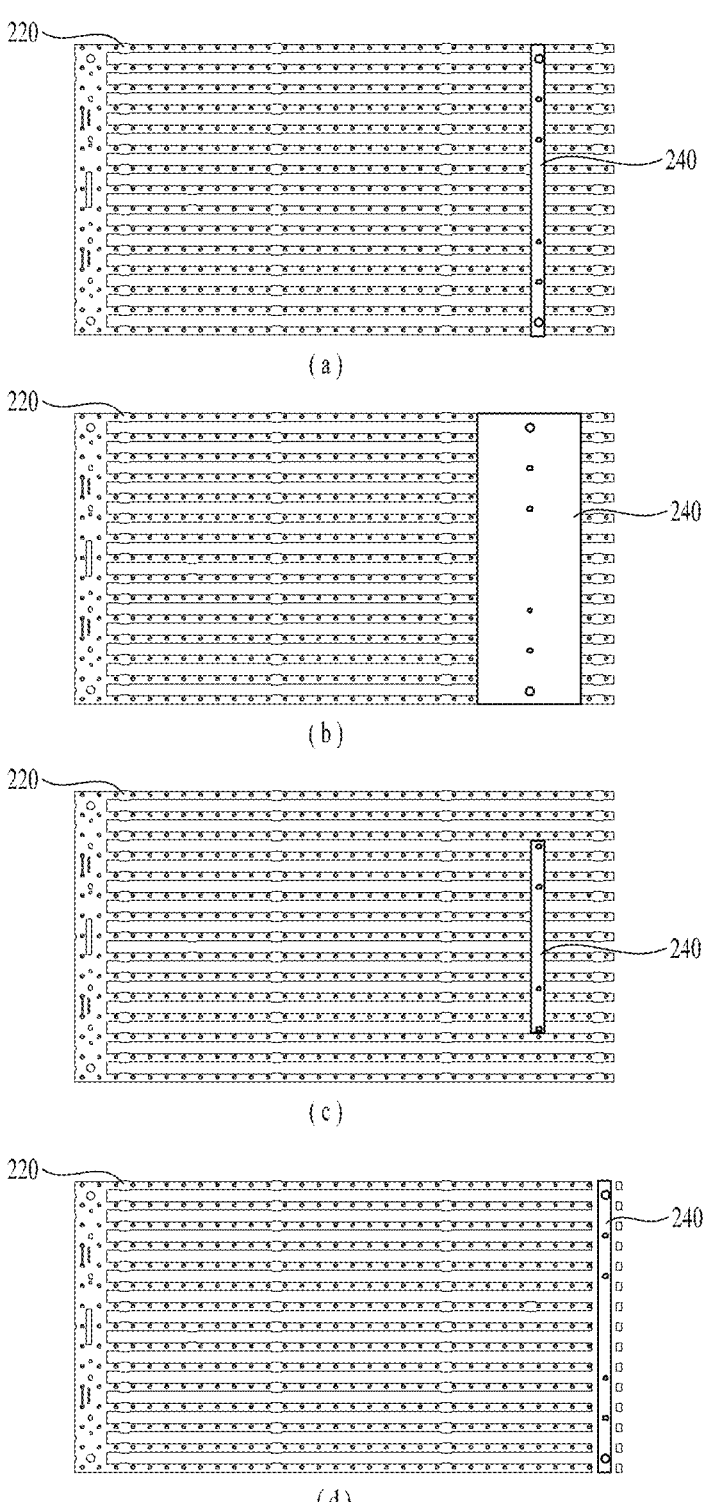
FIG. 6 is a diagram illustrating an example of a backlight substrate and a reinforcement substrate of a display device according to an embodiment of the present disclosure.

FIG. 6 is a diagram illustrating an example of the backlight substrate 220 and the reinforcement substrate 240 of the display device 100 according to an embodiment of the present disclosure.

Since members consecutively arranged in the first direction exist in the direction of the first substrate 221, the first substrate 221 is more rigid than the end portion of the second substrate. Accordingly, the reinforcement substrate 240 may be disposed at a position spaced apart from the first substrate 221 in the second direction.

As shown in FIG. 6(*a*), the reinforcement substrate 240 may be coupled to the backlight substrate 220 so that the first direction can serve as the longitudinal direction across the second substrate 222. The reinforcement substrate 240 may be disposed at the back surface of the backlight substrate 220 to avoid interference with the LEDs 227.

The reinforcement substrate 240 can be coupled to the backlight substrate 220 using a back adhesive tape that bonds the cover bottom 102 and the backlight substrate 220 to each other. That is, the reinforcement substrate 240 may be located on the back surface of the back adhesive tape.

As shown in FIG. 6(*b*), the reinforcement substrate 240 having a wide width in the second direction may be used to ensure rigidity. However, in this case, the volume and weight of the reinforcement substrate 240 increase, so that the width by which the reinforcement substrate 240 can secure rigidity greater than a reference rigidity is requisite for the reinforcement substrate 240.

The reinforcement substrate 240 may be partially applied as shown in FIG. 6(*c*), or the reinforcement substrate may be placed adjacent to the end of the second substrate 222 as shown in FIG. 6(*d*). Since the first substrate 221 is located on the left side in the drawing, the substrate can be placed adjacent to the right end of the backlight substrate 220.

Figure 7:
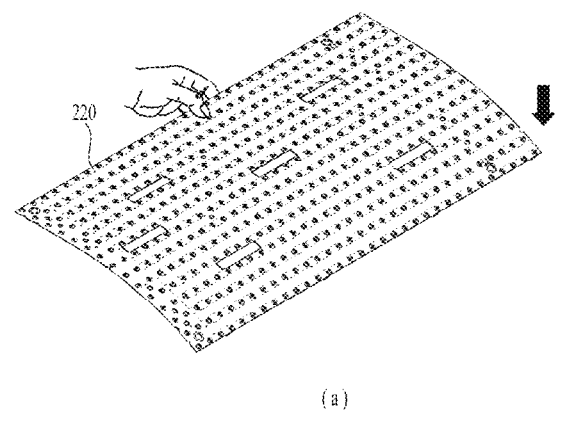
FIG. 7 is a diagram illustrating sagging of a display module depending on whether the reinforcement substrate is applied or not.
Figure 7:
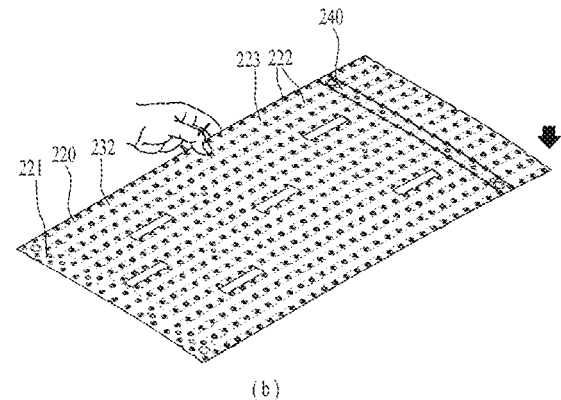

FIG. 7 is a diagram illustrating sagging of the display module 200 depending on whether the reinforcement substrate 240 is applied or not. FIG. 7(*a*) is a diagram illustrating the backlight substrate 220 to which the reinforcement substrate 240 is not applied, and FIG. 7(*b*) is a diagram illustrating the backlight substrate 220 having a back surface on which the reinforcement substrate 240 is disposed.

When one side of the backlight substrate 220 in the first direction is grasped, the second substrates 222 are spaced apart from each other in the first direction, so that the second substrate 222 may be bent as shown in FIG. 7(*a*). However, when the reinforcement substrate 240 is applied to the backlight substrate 220, the first substrate 221 and reinforcement substrate 240 can maintain a flat state as shown in FIG. 7(*b*) by limiting bending deformation in the first direction.

Figure 8:
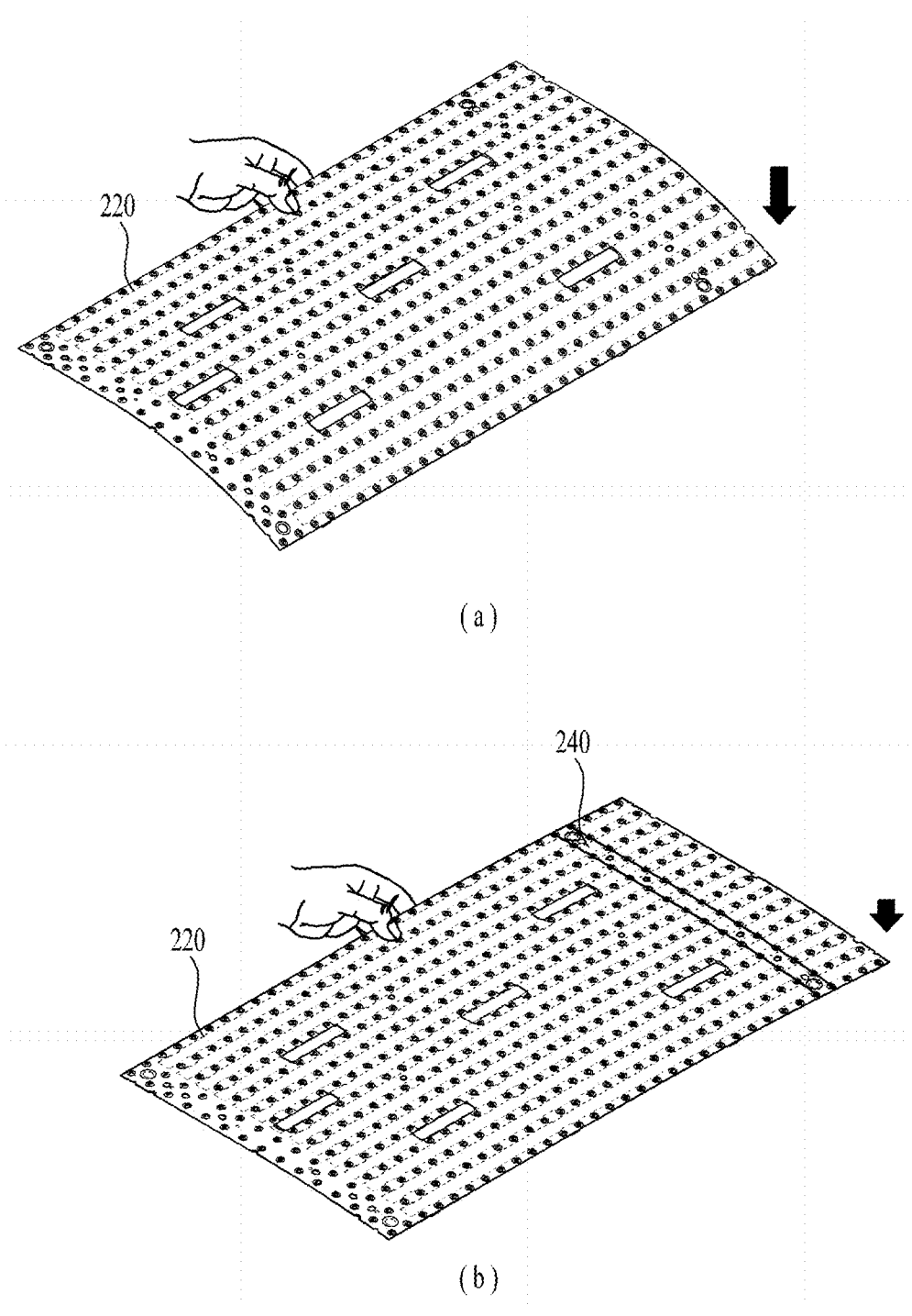
FIG. 8 is a cross-sectional view illustrating a display device according to an embodiment of the present disclosure.
Figure 9:
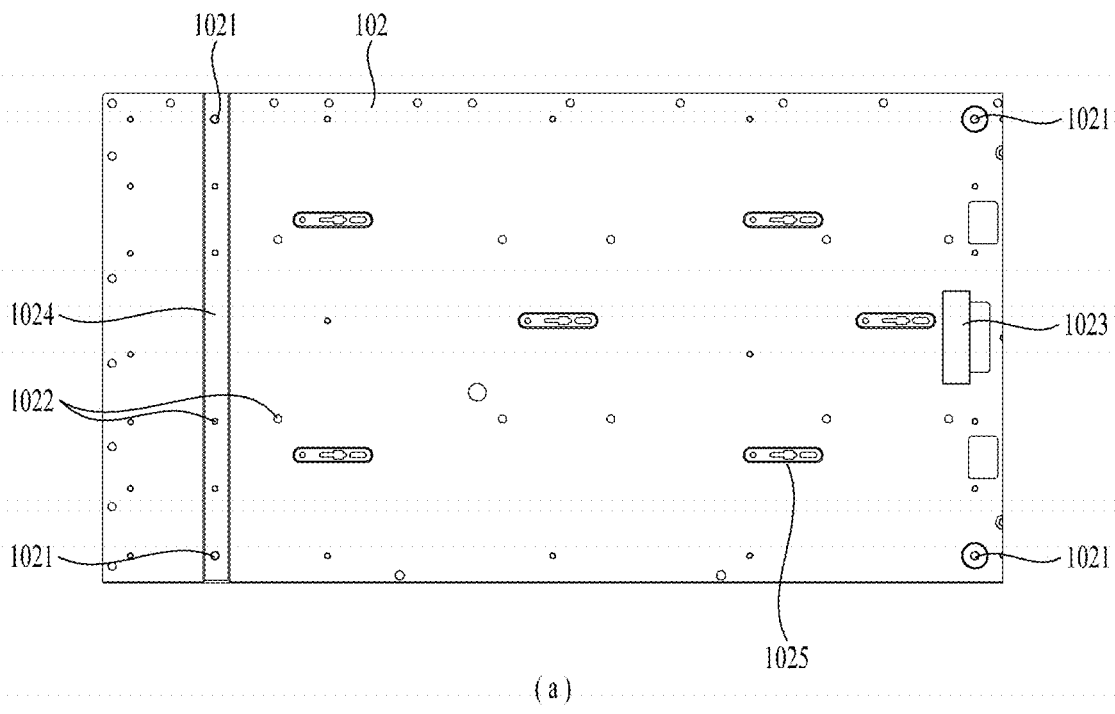
FIG. 9 is a diagram illustrating a method of assembling a diffuser plate supporter of a display device according to an embodiment of the present disclosure.
Figure 9:
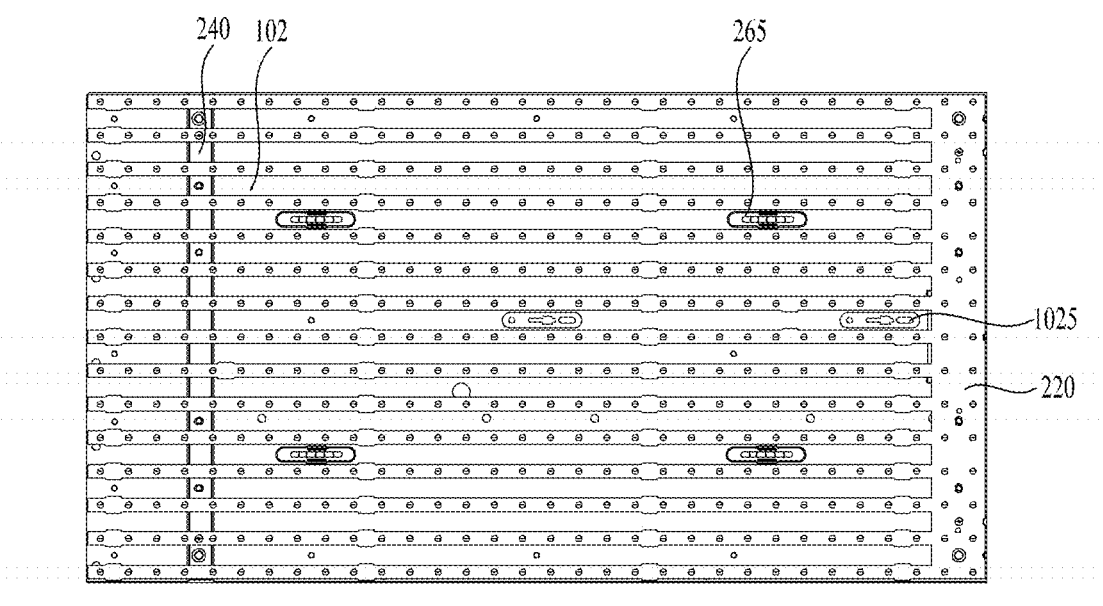

FIGS. 8 and 9 are diagrams illustrating a state in which the cover bottom 102 and the backlight substrate 220 are coupled to the cover bottom 102. FIG. 8 is a diagram illustrating an embodiment in which a plurality of display modules 200 is arranged in a grid shape on one cover bottom 102 as shown in the embodiment of FIG. 2(*b*). FIG. 8(*a*) is a diagram illustrating the cover bottom 102, and FIG. 8(*b*) is a diagram illustrating a state in which the backlight substrate 220 is seated on the cover bottom 102.

The present embodiment shows a (3×3) array, and cover bottom 102 may be composed of one member. As described above, a heat dissipation sheet may be further provided on the front surface of the cover bottom 102 to improve heat dissipation performance.

The heat dissipation sheet may use a plate-shaped member of the same size as the cover bottom 102, and may be divided into a plurality of pieces for convenience of fabrication and distribution, so that the divided heat dissipation sheets can be placed on the front surface of the cover bottom 102.

The heat dissipation sheet shown in FIG. 8(*a*) is divided in a zigzag pattern at the center of the cover bottom 102.

Referring to FIG. 8(*b*), the plurality of backlight substrates 220 may all be arranged in the same direction, but the backlight substrates 220 may be arranged symmetrically so that the first substrates 221 are adjacent to each other.

For convenience of LED interconnection lines on the first substrate 221, two from among three backlight substrates 220 arranged in the horizontal direction can be placed adjacent to each other. The LED drivers connected to the first substrates 221 are arranged adjacent to each other, so that the LED drivers can be easily connected to a controller mounted on the back surface of the cover bottom 102.

FIG. 9 is an enlarged view of a dotted line portion shown in FIG. 8, illustrating a portion corresponding to one display module 200. Referring to FIG. 9(*a*), a groove 1024 may be formed at a position corresponding to the reinforcement substrate 240 so that the reinforcement substrate 240 can be seated on the cover bottom 102.

The groove 1024 may extend long in the first direction like the reinforcement substrate 240, and a driver hole 1023 through which the LED driver passes may be formed spaced apart from the groove 1024 where the reinforcement substrate 240 is located.

A guide protrusion 1021 that guides the backlight substrate 220 to a correct position may be located in the front direction of the cover bottom 102. A guide protrusion 1021 of the right side of FIG. 9 may be formed so that the first guide hole 224 of the first substrate 221 can be inserted therein, and a guide protrusion 1021 of the left side of FIG. 9 may be formed so that the second guide hole 244 of the reinforcement substrate 240 can be inserted therein.

There may be a plurality of first guide holes 224 and second guide holes 244 spaced apart in the vertical direction, and the cover bottom 102 may include four or more guide protrusions 1021.

Figure 10:
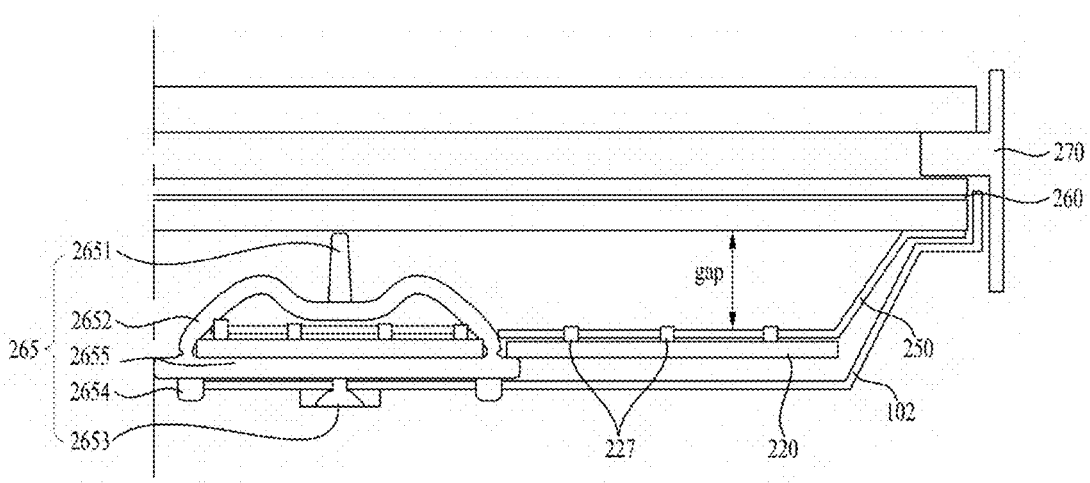
FIGS. 10 and 11 are diagrams illustrating a state in which the backlight substrate is coupled to the cover bottom.

FIG. 10 is a cross-sectional view illustrating the display device 100 according to an embodiment of the present disclosure.

Referring to FIG. 10, the cover bottom 102 may include a supporter coupling portion 1025 to which the diffuser-plate supporter 265 is coupled. The diffuser-plate supporter 265 is configured to maintain the distance between the diffuser plate 261 and the LEDs 227 mounted on the backlight substrate 220, and may protrude forward. In order to stably support the diffuser plate 261, the supporter 265 may be fixed to the supporter coupling portion 1025 of the cover bottom 102.

The diffuser-plate supporter 265 may be disposed between the second substrates 222 as shown in FIG. 9(*b*).

The supporter 265 may support the diffusion sheet in the thickness direction so that the diffusion sheet can be spaced apart from the LEDs 227, and may be disposed between the second substrates 222. As a result, when the display device 100 is installed upright, the supporter 265 can support the second substrate 222 so that the second substrate 222 can be prevented from sagging downward.

In so far as the supporter 265 of the diffuser plate 261 is disposed in a portion of the display panel 210, the supporter 265 can sufficiently perform a necessary function. As shown in FIG. 9(*b*), many more supporter coupling portions 1025 than the necessary number of diffuser-plate supporters 265 may be formed as redundant supporter coupling portions. If necessary, such redundant supporter coupling portions 1025 may be configured such that additional diffuser-plate supporters 265 are disposed therein.

The diffuser-plate supporter 265 may include a base 2655 coupled to the supporter coupling portion 1025 of the cover bottom 102. The diffuser-plate supporter 265 may include a support portion 2651 formed to contact the back surface of the diffuser plate 261, and an elastic portion 2652 disposed between the base 2655 and the base 2655.

If the elastic portion 2652 is not present, the display panel 210 may be damaged by the supporter 265 in the event of occurrence of external impact. As a result, impact of a predetermined magnitude is absorbed to prevent the display panel 210 from being damaged, and at the same time the diffuser plate 261 can be supported.

Figure 11:
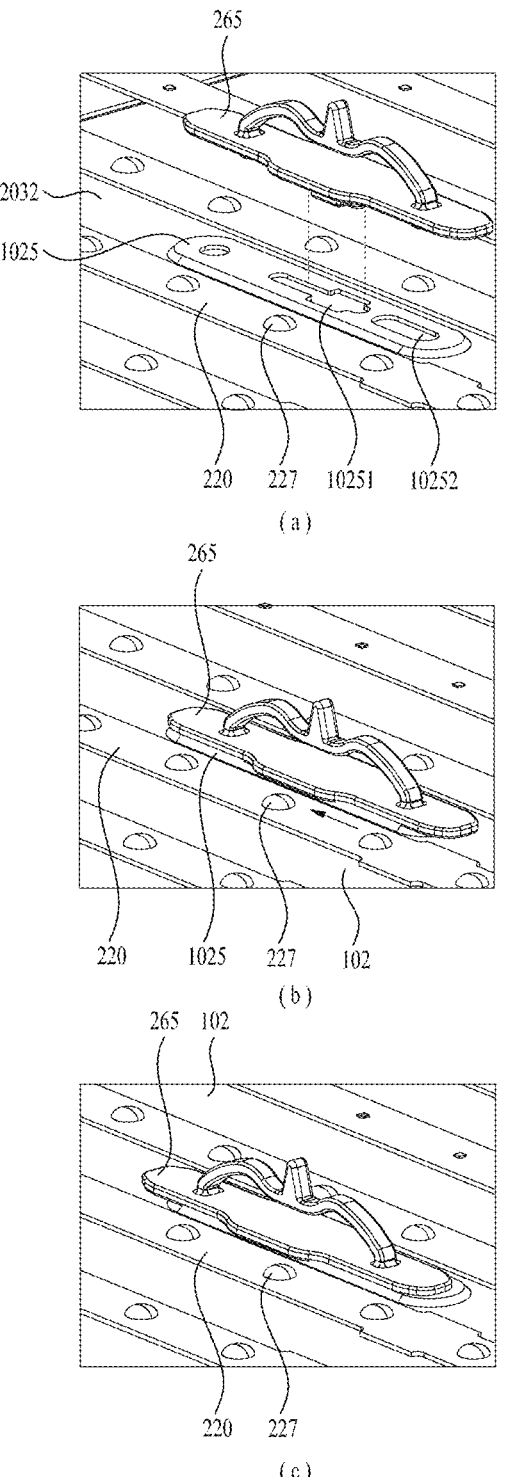

FIG. 11 is a diagram illustrating a method of coupling the diffuser-plate supporter 265 of the display device 100 according to an embodiment of the present disclosure. The supporter coupling portion 1025 may include a first hole 10251 extending in the second direction and a second hole 10252 located on the left and right of the first hole 10251.

After the first fastening portion 2653 located at the center of the diffuser-plate supporter 265 is inserted into the first hole 10251, the supporter 265 may slide in a direction in which the diameter of the first hole 10251 becomes smaller. Then, a second fastening portion 2654 can be inserted into the second hole 10252.

The first fastening portion 2653 may have an expanded end portion, and when the first fastening portion 2653 slides to a section in which the first hole 10251 has a small width, the first fastening portion 2653 is not separated from the first hole 10251.

Meanwhile, as shown in FIG. 3, the back adhesive tape 232 may include an opening 232*h* at a position corresponding to the supporter coupling portion 1025. As shown in FIG. 11, the supporter coupling portion 1025 is exposed in the front direction through the opening 232*h* of the back adhesive tape 232, so that the diffuser-plate supporter 265 can be fastened.

The front adhesive tape 231 and the back adhesive tape 232 may also exist in the space between the plurality of second substrates 222. The front adhesive tape 231 and the back adhesive tape 232 can be attached to each other in the space 223 between the plurality of second substrates 222, and the fastening force between the backlight substrate 220 and the diffuser plate 261 can be improved.

The backlight unit (BLU) according to the present disclosure can reduce production costs while securing rigidity thereof.

In addition, the backlight unit (BLU) according to the present disclosure can improve the convenience of the fastening assembly process by including guide holes to facilitate coupling to the cover bottom.

The detailed description above is not to be construed as limiting in any aspect and should be considered exemplary. The scope of this disclosure shall be determined by a reasonable interpretation of the appended claims. Thus, it is intended that the present disclosure cover the modifications and variations of this disclosure provided they come within the scope of the appended claims and their equivalents.

14

What is claimed is:

1. A backlight unit comprising:
a backlight substrate configured to include a first substrate extending in a first direction and a plurality of second substrates extending from the first substrate in a second direction perpendicular to the first direction while being spaced apart from each other in the first direction;
a plurality of light emitting diodes (LEDs) arranged on a front surface of the plurality of second substrates to be spaced apart from each other in the second direction;
a back adhesive tape disposed on a back surface of the backlight substrate and provided with at least one diffuser plate supporter (DPS) hole disposed between the plurality of second substrates; and
a reinforcement substrate configured to cross the plurality of second substrates and extending in the first direction,
wherein the reinforcement substrate is disposed on a back surface of the back adhesive tape.

2. The backlight unit according to claim 1, further comprising:
a first guide hole formed in the first substrate and a second guide hole formed in the reinforcement substrate,
wherein
the first guide hole and the second guide hole are formed at the same position in the first direction.

3. The backlight unit according to claim 1, further comprising:
a first screw hole formed in the first substrate and a second screw hole formed in the reinforcement substrate,
wherein
the first screw hole and the second screw hole are formed at the same position in the first direction.

4. The backlight unit according to claim 1, wherein:
the reinforcement substrate is spaced apart from the first substrate and disposed adjacent to an end of the second substrate.

5. The backlight unit according to claim 1, wherein:
the reinforcement substrate has the same length as the first substrate.

6. The backlight unit according to claim 1, further comprising:
a front adhesive tape located on a front surface of the backlight substrate and provided with a hole formed in a portion corresponding to each light emitting diode (LED); and
a reflector coupled to a front surface of the front adhesive tape and provided with an opening formed in a portion corresponding to each light emitting diode (LED),
wherein
the front adhesive tape and the back adhesive tape are bonded to each other not only on the plurality of second substrates but also between the plurality of second substrates.

7. The backlight unit according to claim 1, wherein:
a distance between the plurality of second substrates in the first direction is greater than a width of each of the second substrates in the first direction,
wherein
each of the second substrates includes a node protruding toward both sides of the second substrate in the second direction.

8. A display device comprising:
a cover bottom;
a backlight unit disposed at a front surface of the cover bottom; and
a liquid crystal panel disposed at a front surface of the backlight unit, wherein the backlight unit includes:

a backlight substrate configured to include a first substrate extending in a first direction and a plurality of second substrates extending from the first substrate in a second direction perpendicular to the first direction while being spaced apart from each other in the first direction;

a plurality of light emitting diodes (LEDs) arranged on a front surface of the plurality of second substrates to be spaced apart from each other in the second direction; and a reinforcement substrate configured to cross the plurality of second substrates and extending in the first direction, wherein the first substrate includes a first guide hole, wherein the reinforcement substrate includes a second guide hole, and wherein the cover bottom includes a plurality of guide protrusions inserted into the first guide hole or the second guide hole.

9. The display device according to claim 8, further comprising:

a first screw hole formed in the first substrate and a second screw hole formed in the reinforcement substrate, wherein the first screw hole and the second screw hole are formed at the same position in the first direction.

10. The display device according to claim 8, wherein:

the cover bottom has a groove corresponding to the reinforcement substrate so that the groove is formed on a front surface of the cover bottom.

11. The display device according to claim 8, wherein the backlight unit includes:

a front adhesive tape located on a front surface of the backlight substrate and provided with a hole formed in a portion corresponding to each light emitting diode (LED);

a reflector coupled to a front surface of the front adhesive tape and provided with an opening formed in a portion corresponding to each light emitting diode (LED); and a diffuser plate located on a front surface of the reflector.

12. The display device according to claim 11, further comprising:

a diffuser plate supporter (DPS) configured to support a back surface of the diffuser plate while forming an optical gap between the light emitting element (LED) and the diffuser plate, wherein the DPS is disposed between the plurality of second substrates.

13. The display device according to claim 12, wherein the DPS includes:

a base coupled to a front surface of the cover bottom;

a support portion configured to contact a back surface of the diffuser plate; and an elastic portion disposed between the base and the support portion and configured to maintain the optical gap.

14. The display device according to claim 13, further comprising:

a back adhesive tape disposed on a back surface of the backlight substrate and provided with a DPS hole corresponding to the base of the DPS.

15. The display device according to claim 14, wherein:

the reinforcement substrate is disposed on a back surface of the back adhesive tape.

16. The display device according to claim 11, further comprising:

a back adhesive tape disposed on a back surface of the backlight substrate, wherein the front adhesive tape and the back adhesive tape are bonded to each other between the plurality of second substrates.

17. The display device according to claim 8, wherein:

the backlight unit includes an LED driver connected to the first substrate.

18. The display device according to claim 8, wherein:

a distance between the plurality of second substrates in the first direction is greater than a width of each of the second substrates in the first direction, wherein each of the second substrates includes a node protruding toward both sides of the second substrate in the second direction.

19. A backlight unit comprising:

a backlight substrate configured to include a first substrate extending in a first direction and a plurality of second substrates extending from the first substrate in a second direction perpendicular to the first direction while being spaced apart from each other in the first direction;

a plurality of light emitting diodes (LEDs) arranged on a front surface of each of the second substrates;

a front adhesive tape located on a front surface of the backlight substrate; and a back adhesive tape disposed on a back surface of the backlight substrate, wherein the front adhesive tape and the back adhesive tape are bonded to each other between the plurality of second substrates.

* * * * *